United States Patent [19]

Stubben

[11] 4,189,728
[45] Feb. 19, 1980

[54] APPARATUS FOR GENERATING A PLURALITY OF MOVING OBJECTS ON A VIDEO DISPLAY SCREEN UTILIZING ASSOCIATIVE MEMORY

[75] Inventor: David R. Stubben, Santa Clara, Calif.

[73] Assignee: Atari, Inc., Sunnyvale, Calif.

[21] Appl. No.: 862,337

[22] Filed: Dec. 20, 1977

[51] Int. Cl.² ............... G06F 3/14; G06K 15/20
[52] U.S. Cl. .................... 340/725; 340/721; 340/747; 340/799; 273/85 G; 273/DIG. 28; 273/313
[58] Field of Search ............. 340/324 A, 324 AD, 24, 340/27 NA, 724, 798, 725, 799, 747, 814, 721; 273/85 G, DIG. 28, 101.2; 35/12 F, 12 N; 358/104

[56] References Cited

U.S. PATENT DOCUMENTS

| | | | |
|---|---|---|---|
| 3,889,253 | 6/1975 | Ross | 340/323 |
| 4,016,362 | 4/1977 | Bristow et al. | 358/142 |
| 4,026,555 | 5/1977 | Kir schner | 273/85 R |
| 4,045,789 | 8/1977 | Bristow | 340/324 AD |

OTHER PUBLICATIONS

*Gametronics* vol. 1, 1975, pp. 31-43, Li, Kam, "An Approach to Microprocessor-Based Game Architecture.".

Primary Examiner—John W. Caldwell, Sr.
Assistant Examiner—Joel Miller
Attorney, Agent, or Firm—Townsend and Townsend

[57] ABSTRACT

In a video game where several objects are moved across the screen in a horizontal axis in 16 different zones, a RAM type memory has memory locations exclusively dedicated to each zone to provide a starting address for the object in its zone. A single time shared horizontal counter responds to the various starting addresses to successively cause video signals to be generated which provides images of such objects.

3 Claims, 2 Drawing Figures

APPARATUS FOR GENERATING A PLURALITY OF MOVING OBJECTS ON A VIDEO DISPLAY SCREEN UTILIZING ASSOCIATIVE MEMORY

BACKGROUND OF THE INVENTION

The present invention is directed to apparatus for generating a plurality of moving objects on a video display screen utilizing associative memory.

In a video game, motion circuitry may typically include horizontal and vertical counters for each object. This may be necessary where the movement of each game object is relatively complex. Such circuitry is shown in Bushnell U.S. Pat. No. 3,793,483. On the other hand, rather than specifically using counters, random access memories in conjunction with a microprocessor unit may be effectively used as counters by updating the horizontal and vertical positions of each object during vertical blanking. Such a system is shown in a copending application in the name of Mayer and Milner entitled "Method for Generating A Plurality of Moving Objects on a Video Display Screen", U.S. Pat. No. 4,116,444, issued Sept. 26, 1978, and assigned to the present assignee.

Where, however, the architecture of game includes motion that is restricted to one axis, for example, a ship or submarine moving across the screen along the horizontal it is not necessary to use the above circuitry.

OBJECTS AND SUMMARY OF THE INVENTION

It is, therefore, a general object of the present invention to provide improved apparatus for generating a plurality of moving objects on a video display screen.

It is another more specific object of the invention to provide apparatus as above which includes logic circuitry which takes advantage of the game architecture where all objects move in one axis.

In accordance with the above objects there is provided apparatus for generating a plurality of moving objects on a video display screen scanned in successive frames by an image forming beam traversing the screen along a plurality of horizontal lines in response to horizontal and vertical synchronizing signals. Memory means have a plurality of addressable memory locations each exclusively associated with one of a plurality of effective horizontal zones on the screen. Each zone includes a plurality of horizontal lines. Each memory location includes stored data indicative of the horizontal starting location of the object exclusively dedicated to each zone. The addressable memory locations of the memory means are accessed in accordance with the line frequency of the display. Horizontal line counter means is responsive to each horizontal traverse of the beam for comparing the beam location with the starting location to provide a video display signal.

DETAILED DESCRIPTION OF THE PREFERRED EMBODIMENT

Figure 1:
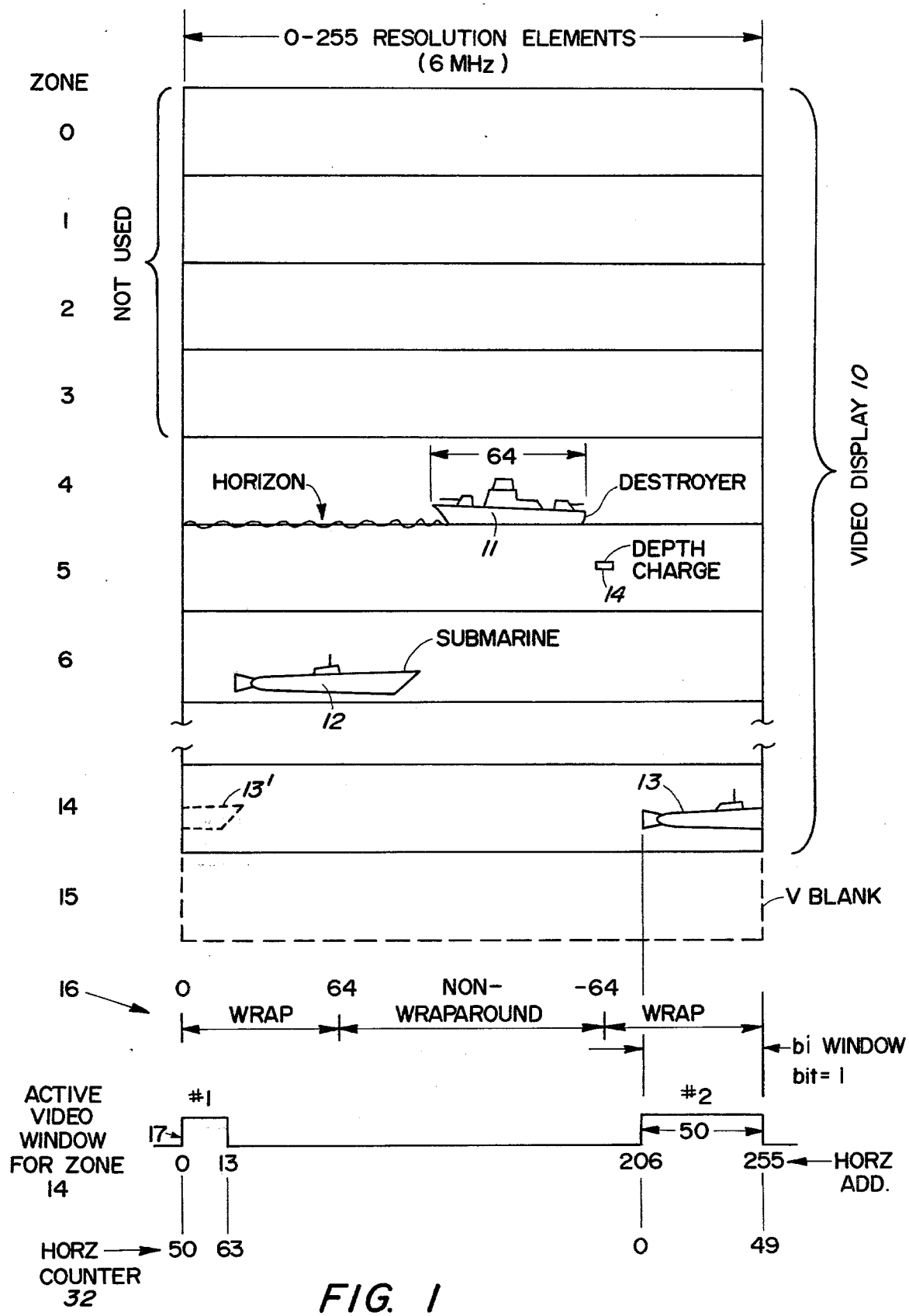
FIG. 1 is a diagrammatic view of a video display screen along with associated timing waveforms related to the horizontal time base of the video display screen.

FIG. 1 illustrates the video game of the present invention where a video display screen 10 includes as displayed objects a destroyer 11 and two submarines 12 and 13. In general, the player operating the destroyer 11 tries to hit enemy submarines with depth charges 14. Each submarine moves across the video display screen in a horizontal band or zone of 16 video lines. There are 16 zones designated 0 through 15. The top three zones are not used and zone 4 is intended as the horizon of the ocean which the destroyer 11 moves across.

Video display screen 10 has 256 resolution elements for each horizontal line (meaning that a six megahertz frequency is used with the standard video raster timing). Each object has a window or width of 64 resolution elements as indicated by the destroyer 11. Zone 15 in dashed outline occurs only during vertical blanking. Only two submarine targets 12, 13 are illustrated but there are, of course, several others which travel at different speeds and different depths below the destroyer.

The scores of the game vary depending upon the level of difficulty; for example, a higher score for a relatively fast moving submarine. The objects may move from left to right or right to left whichever is convenient for the objectives of the game.

Where a horizontal object moves across the video screen the effect that may occur is termed "wraparound"; that is, when for example, object 13 is going off the right edge of the screen, unless proper blanking is provided, an undesired portion 13' may appear at the other edge of the screen. With an object of 64 resolution elements in width, wraparound will only occur at a distance of 64 elements from the left or right edge with the intermediate center part of the screen being a non-wraparound area as shown by diagram 16.

From a timing standpoint, the wraparound effect is illustrated by the timing diagram 17 where theoretically active video occurs for a window #1 and a window #2 and a choice must be made between which window is actually to be open for display. This, of course, is dependent upon the direction of motion of the object; viz, from left to right as shown or from right to left as for the destroyer 11. The remaining notations on the timing diagrams 16 and 17 will become clearer in conjunction with the circuit block diagram of FIG. 2.

The specific technique for eliminating the foregoing wraparound effect is disclosed and claimed in a copending application entitled "Apparatus For Generating At Least One Moving Object Across A Video Display Screen Where Wraparound Of The Object Is Avoided", U.S. Pat. No. 4,129,883, issued Dec. 12, 1978, in the name of the present inventor, and assigned to the present assignee.

Figure 2:
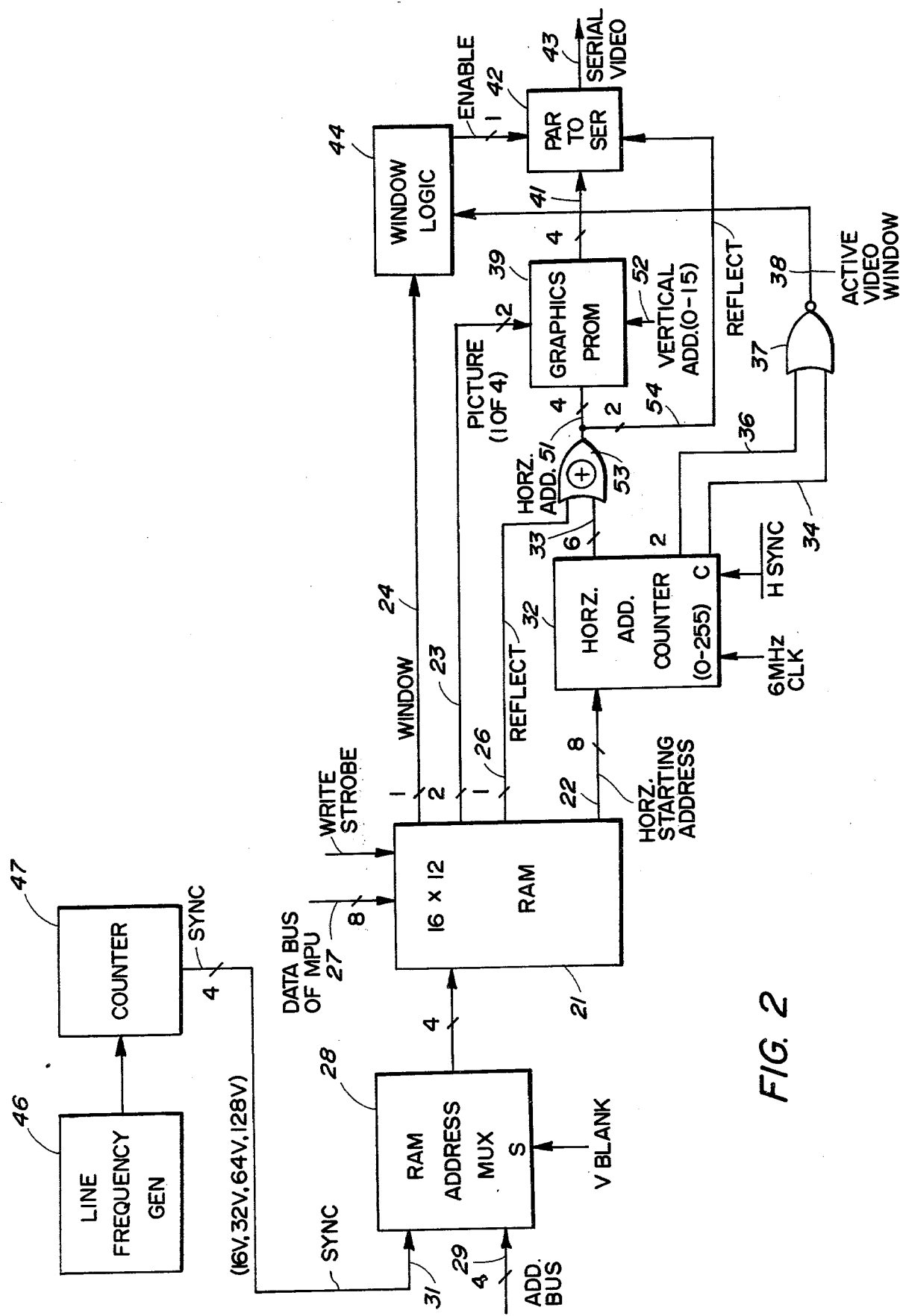
FIG. 2 is a block diagram embodying the present invention.

Referring to FIG. 2, a random access memory 21 is arranged in a logic architecture of 16 by 12 meaning a 12 line or bit parallel output as indicated by the slashes and numbers associated with the output lines and 16 addressable memory locations each of which is exclusively dedicated and associated with a zone 0 through 15. RAM 21 has as outputs 8 bits of data indicating the horizontal starting address of an object on bus 22, two bits indicating the type of picture on bus 23, one bit of data on line 24 which is termed a biwindow bit and a last bit on line 26 which acts to reflect an object 180° such as the difference between, referring to FIG. 1, the destroyer 11 which is moving from right to left versus the submarine 12 which is moving from left to right. The above 12 bits of data are inputted or stored in RAM 21 from an eight bit data bus of a microprocessor unit which is not shown. Such storage occurs during vertical blanking as indicated by the RAM address multiplexer 28 where a four line address bus 29 from the microprocessor unit selects the various memory locations for updating via data bus 27. Because of the eight bit input bus 27 this must occur in two strobes or sequences since 12 bits of data are required.

The stored data of RAM 21 is accessed or read out on the various output lines by the use of the sync bus 31 which multiplexer 28 connects to the RAM 21 to sequentially access in time each of the 16 different memory locations corresponding to each zone of the video display.

In accordance with the invention the sync signals on bus 31 are provided by a line frequency generator 46 driving a counter 47 which at its four line output bus 31 provides signals representing in the vertical scan direction, as indicated, 16 32, 64 and 128 horizontal lines. By a simple permutation of the four bus lines, the RAM 21 is accessed in every zone of the video display 10 or namely every 16 lines. This is effectively a vertical motion counter, although in highly simplified format, and takes advantage of the one axis motion of the video game. Thus sync bus 31 when connected to RAM 21 accesses the addressable memory locations sequentially every 16 horizontal lines and provides on the output bus 22 of the RAM the horizontal starting address of the object dedicated to the present zone which is loaded into the horizontal counter 32.

For example, referring to FIG. 1, such loading is indicated in conjunction with the timing diagram 17 where the horizontal starting address for object 13 is 50. This is effectively the complement of the desired horizontal location at 206 which is subtracted from the total number of resolution elements of 256. The actual horizontal location of the object 13 is best shown in relation to timing diagram 17; that is, starting at 206 and ending at 255 with the other portion 13' of the object, which is not to be displayed, starting at 0 and ending at 13. However at this point in time, the horizontal address counter circuitry does not have the capability of making a determination of which of the wraparound portions 13 or 13' is to be displayed. Thus, horizontal counter 32 which is initially set to start at 50 immediately provides an active video window #1 and later the window #2.

Counter 32 has an 8 bit parallel output consisting of the six line output bus 33 which represents the binary values 1, 2, 4, 8, 16 and 32 and the two most significant bit lines 34 and 36 representing the binary values 64 and 128 which are driving a NOR gate 37. As is apparent from diagram 17 of FIG. 1, the active video windows are indicated by counter 32 and its output bus 33 counting from 0 to 63. Such counting is incremented by a 6 MHz clock which is the horizontal scan rate; thus it is indicative of the actual location of the scanning beam. During this period output lines 34 and 36 are zero. Therefore the output line 38 of NOR gate 37 has a signal on it which is the active video window signal of timing diagram 17. On bus 33 the horizontal addresses 0 through 63 (actually 50–63 and 0–49) are read out to a graphics PROM 39 which has stored in it video data representing the various objects 11, 12 and 13. The object selected is transferred via 4 bit bus 41 to a parallel to serial converter 42 to provide a serial video line 43 which is connected with appropriate horizontal and vertical sync timing to video display 10.

In order to determine which portion of object 13 is to be displayed because of the wraparound problem, decoding logic means 44 is provided which receives the active video window on line 38, the biwindow bit on line 24 and provides on its output line 46 a true window enable signal which is connected to parallel to serial converter 42. For example, the enable would only occur during window #2 as illustrated in FIG. 1. This is more fully disclosed in the above copending application.

Referring more specifically to the operation of graphics PROM 39, bus 33 from counter 32 is connected to the PROM through an exclusive NOR gate 53. The NOR gate is also connected to reflect line 26 to provide for a reflection of an object in a manner well-known in the art. The six line output bus from NOR gate 53 includes the four line horizontal address bus 51 and in addition a two line bus 54 which is coupled to parallel to serial converter 42 to determine from which end the readout occurs for reflect purposes. The four bits on bus 51 causes a readout of video data on bus 41 in "nibbles" (one-half byte) of four parallel bits each. Since 64 resolution elements are required for an object, there are 16 four bit nibbles, and 16 choices are easily provided by the four line binary bus 51. In other words, the address data on bus 51 addresses each nibble sequentially as the horizontal address counter 32 is counting from 0 through 63.

At the same time a vertical address is input to PROM 39 on bus 52 which determines which line of each 16 line zone is being displayed.

Thus in summary RAM 21 is used as associative storage to provide the display of up to 15 objects at the same time. Each horizontal starting location of an object which is stored in RAM 21 is, of course, at a memory location exclusively dedicated to the associated zone 0 through 15. This is accomplished without the need of an actual vertical motion counter and with the use of only one horizontal address counter.

What is claimed is:

1. Apparatus for generating a plurality of moving objects on a video display screen scanned in successive frames by an image forming beam traversing said screen along a plurality of horizontal lines in response to horizontal and vertical synchronizing signals comprising; memory means having a plurality of addressable memory locations each exclusively associated with one of a plurality of effective horizontal zones on said screen, each of said zones including a plurality of said horizontal lines, each of said memory locations including stored data indicative of the horizontal starting location of a said object exclusively dedicated to such zone; means for accessing said addressable memory locations of said memory means in accordance with the horizontal line count of said display; and horizontal counter means presettable with said stored data and responsive to each horizontal traverse of said beam for comparing such beam location with said starting location to provide a video display signal.

2. Apparatus as in claim 1 including a graphics memory for storing video data representing said objects such graphics memory being activated by said video display signal.

3. Apparatus as in claim 2 where each said memory location also stores data indicative of the type of object to be displayed said graphics memory being responsive to said data.

* * * * *